United States Patent
Youn

(10) Patent No.: US 8,633,997 B2
(45) Date of Patent: Jan. 21, 2014

(54) BLOCK-BASED VARIATIONAL IMAGE PROCESSING METHOD

(75) Inventor: Jeongnam Youn, San Jose, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 681 days.

(21) Appl. No.: 12/580,209

(22) Filed: Oct. 15, 2009

(65) Prior Publication Data

US 2011/0090354 A1    Apr. 21, 2011

(51) Int. Cl.
*H04N 5/228* (2006.01)

(52) U.S. Cl.
USPC ...................................... 348/222.1

(58) Field of Classification Search
USPC ............... 348/222.1, 231.99; 382/254
See application file for complete search history.

(56) References Cited

U.S. PATENT DOCUMENTS

| | | | |
|---|---|---|---|
| 2001/0008425 A1 | 7/2001 | Shin et al. | |
| 2003/0103681 A1* | 6/2003 | Guleryuz | 382/275 |
| 2004/0013305 A1* | 1/2004 | Brandt et al. | 382/224 |
| 2006/0228036 A1 | 10/2006 | Avinash | |
| 2007/0185946 A1* | 8/2007 | Basri et al. | 708/200 |
| 2007/0201750 A1* | 8/2007 | Ito et al. | 382/228 |
| 2008/0204598 A1 | 8/2008 | Maurer et al. | |
| 2008/0246877 A1* | 10/2008 | Hahn | 348/452 |
| 2009/0148062 A1 | 6/2009 | Gabso et al. | |
| 2011/0046927 A1* | 2/2011 | Jeong et al. | 703/2 |

* cited by examiner

*Primary Examiner* — Gevell Selby

(74) *Attorney, Agent, or Firm* — Haverstock & Owens LLP

(57) ABSTRACT

Block-based variational image processing provides improved image processing by utilizing portions of an image rather than the entire image. The image is divided into multiple smaller portions, and then iterations to determine a partial differential equation for an image processing application are performed on the smaller portions. After performing the iterations on a portion, the resulting information is able to be stored in an external memory. This results in a much lower bandwidth requirement for the data, enabling the method to be performed in hardware. Additionally, the block-based variational image processing utilizes only a small number of neighboring pixels for each iteration.

15 Claims, 8 Drawing Sheets

BLOCK-BASED VARIATIONAL IMAGE PROCESSING METHOD

FIELD OF THE INVENTION

The present invention relates to the field of image processing. More specifically, the present invention relates to block-based variational image processing.

BACKGROUND OF THE INVENTION

For several years, there have been large research activities on variational image processing. In variational image processing, it is common to adopt a partial differential equation (PDE) in a given problem domain. With the appropriate PDE, the variational image processing is able to be realized using an iteration method to produce an improvement in various fields.

Although variational processing is known as a tool that is able to provide various image processing functionality, there are several disadvantages:

1. Iteration-Based Processing

The variational method is an iteration-based method. In other words, the solution of PDE is able to be solved only by iterations. As the iteration increases, more accurate results are able to be achieved. However, due to this iteration, a significant processing delay is unavoidable.

2. Frame-Based Processing

The variational method is a frame-based method. In other words, it requires that all of the frame data is available. However, in a hardware implementation, it is too expensive to provide such a big memory in System On-Chip (SOC). Practically, due to the fact that the frame memory is not able to be implemented in SOC, the intermediate results are stored in 'external' memory.

A major problem with frame-based processing in variational image processing is that the transaction image data is too large because one iteration requires one transaction of a whole image. FIG. 1 shows a diagram using an entire image for each iteration. In each transaction 100, an image 102 is transferred via a bus 106 and after the computation is stored as a stored image 104 which uses a significant amount of bandwidth.

If the required iteration is N, the required bandwidth will be:

Required Transaction=$N \times$Frame Transaction

In general, N is more than 100. Therefore, this transactional bandwidth is too high for practical implementation.

SUMMARY OF THE INVENTION

Block-based variational image processing provides improved image processing by utilizing portions of an image rather than the entire image. The image is divided into multiple smaller portions, and then iterations to determine a partial differential equation for an image processing application are performed on the smaller portions. After performing the iterations on a portion, the resulting information is able to be stored in an external memory. This results in a much lower bandwidth requirement for the data, enabling the method to be performed in hardware. Additionally, the block-based variational image processing utilizes only a small number of neighboring pixels for each iteration.

In another aspect, a method implemented on a device comprises selecting a portion of an image and a neighboring area of the portion, iteratively performing a computation using the portion of the image and the neighboring area and storing a resulting portion. The neighboring area includes K pixels in each direction. The iteratively performing comprises N iterations. K is much less than N. The computation is performed without storing the portion of the image and the neighboring area in an external memory. The resulting portion is stored in an external memory. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a system implemented on a device configured for image processing comprises a portion selection module configured for selecting a portion of an image and a neighboring area of the portion, a computation module operatively coupled to the portion selection module, the computation module configured for iteratively performing a computation using the portion of the image and the neighboring area and a storing module operatively coupled to the computation module, the storing module configured for storing a resulting portion. The neighboring area includes K pixels in each direction. The computation module iteratively performs N iterations. K is much less than N. The computation module is configured to perform the computation without storing the portion of the image and the neighboring area in an external memory. The resulting portion is stored in an external memory. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a device comprises a memory for storing an application, the application configured for selecting a portion of an image and a neighboring area of the portion, iteratively performing a computation using the portion of the image and the neighboring area and storing a resulting portion and a processing component coupled to the memory, the processing component configured for processing the application. The neighboring area includes K pixels in each direction. The iteratively performing comprises N iterations. K is much less than N. The computation is performed without storing the portion of the image and the neighboring area in an external memory. The resulting portion is stored in an external memory. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a digital camera comprises a memory for storing an application, the application configured for selecting a portion of an image and a neighboring area of the portion, iteratively performing a computation using the portion of the image and the neighboring area and storing a resulting portion and a processing component coupled to the memory, the processing component configured for processing the application. The neighboring area includes K pixels in each direction. The iteratively performing comprises N iterations. K is much less than N. The computation is performed

DETAILED DESCRIPTION OF THE PREFERRED EMBODIMENT

Figure 1:
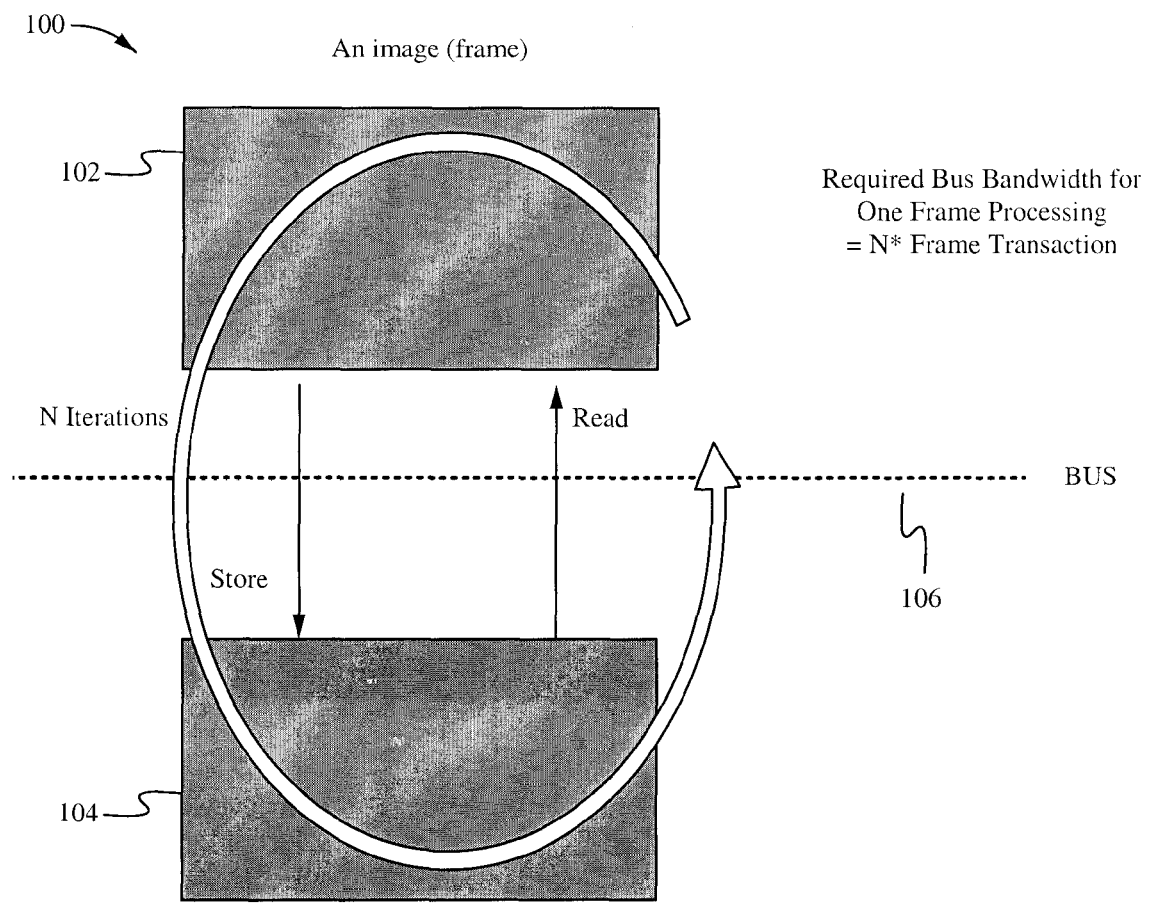
FIG. 1 illustrates a diagram using an entire image for each iteration.
Figure 2:
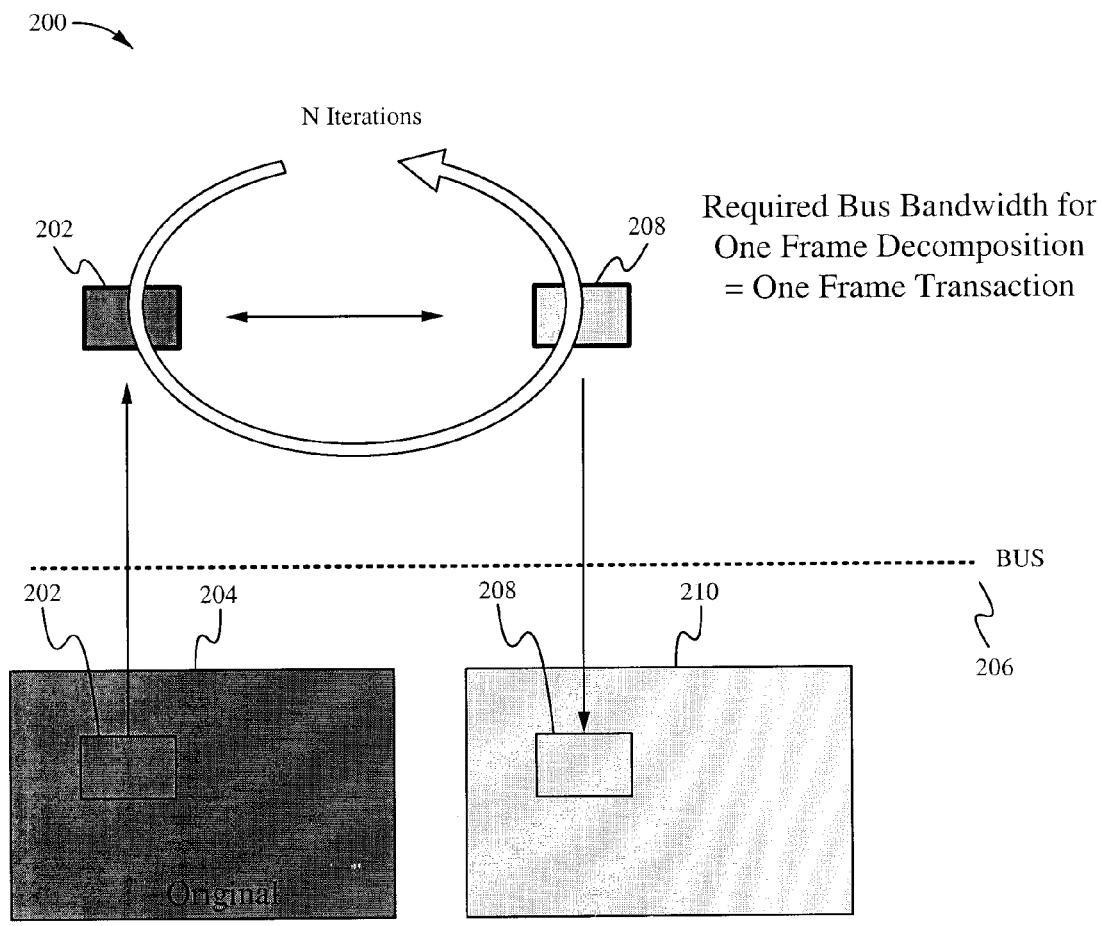
FIG. 2 illustrates a diagram using a block-based approach for each iteration according to some embodiments.

In order to reduce bandwidth, a block-based method is able to be used to perform computations when image processing. In the method, a block of the image is used in an iterative process instead of using the entire image. As shown in FIG. 2, the System On-Chip (SOC) is able to read the block (or portion) of data and process the block only with the required iterations. Once the iterations are completed, the block is stored in an external memory. In each transaction 200, a block 202 of an image 204 is transferred via a bus 206, and then computations occur for N iterations. After the N iterations complete, a resulting block 208 is able to be stored as part of a resulting image 210. Since there is little or no extra data exchanged during the processing, the required bus bandwidth is just one frame transaction.

Figure 3:
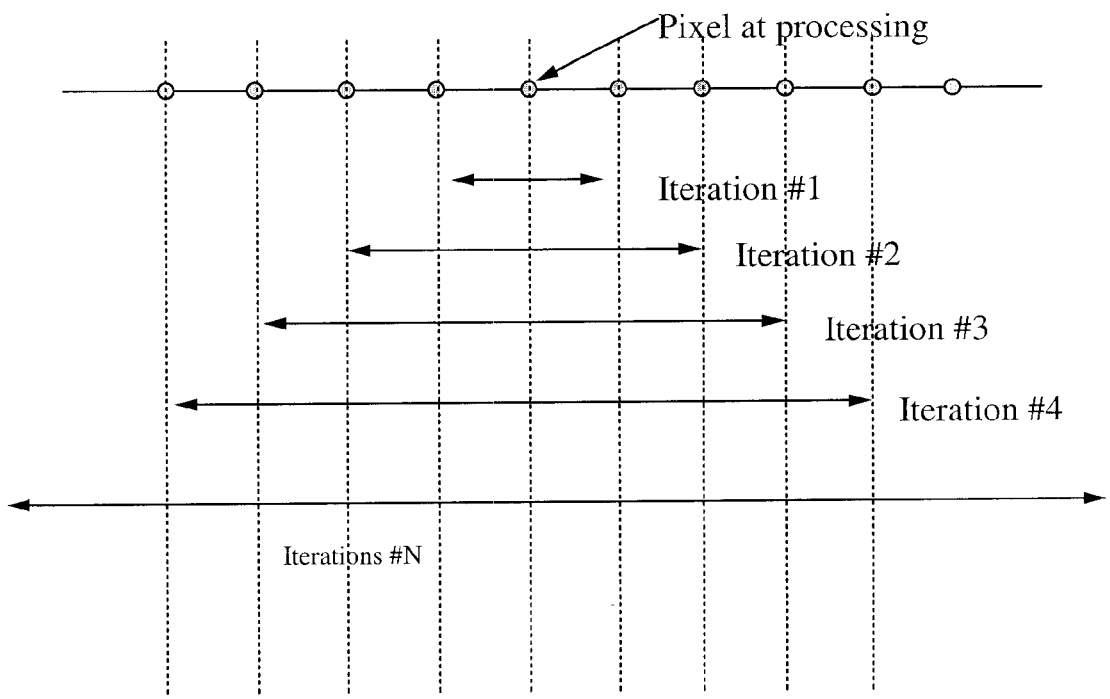
FIG. 3 illustrates a diagram of the number of iterations during processing according to some embodiments.
Figure 4:
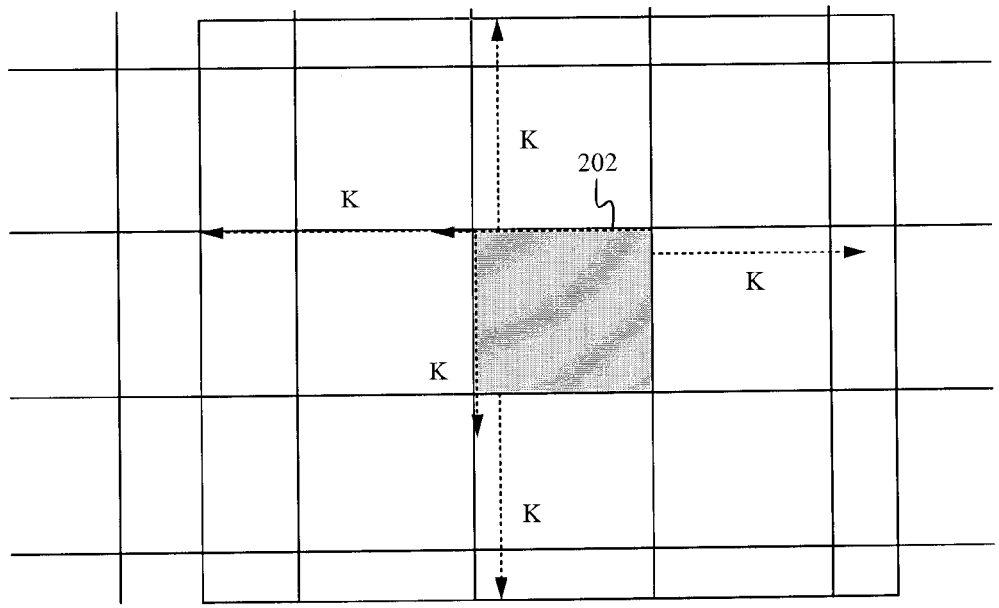
FIG. 4 illustrates a diagram of a portion of an image with a neighboring area according to some embodiments.

The block-based variational method utilizes neighboring pixels of the selected block. The range of neighboring pixels depends on the current iteration. For example, if the current iteration is 50, then +/−50 pixels near the current pixel are used at processing as shown in FIG. 3. Therefore, the processing of a block uses data in other blocks which is an overhead cost. In some embodiments, the block-based variational method uses only a small portion of neighboring pixels (such as +/−K) instead of the whole +/−N pixels, where K is much smaller than N. In order to do this, a slightly larger block 400 than the selected block 202 is read, as shown in FIG. 4.

Figure 5:
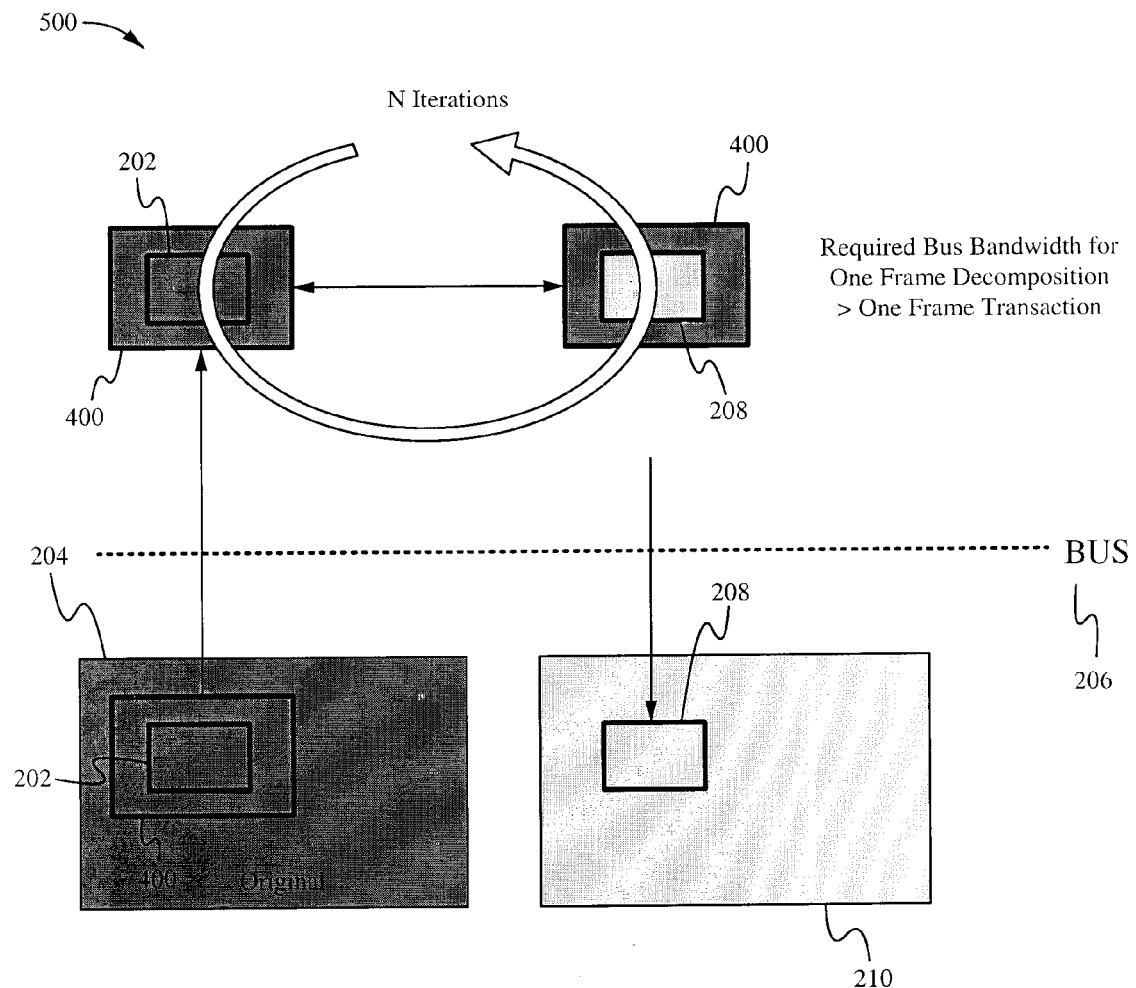
FIG. 5 illustrates a diagram using a block-based approach for each iteration according to some embodiments.

FIG. 5 illustrates a diagram using a block-based approach for each iteration according to some embodiments. In each transaction 500, a block 202 of an image and a neighboring area 400 of the block 202 are transferred via a bus 206. In some embodiments, the neighboring area is a size +/−K (e.g. K pixels in each direction). Then, computations occur for N iterations, where K<<N. As described above, the neighboring area 400 includes neighboring pixels which are used in the calculations. After the N iterations complete, a resulting block 208 is able to be stored as part of a resulting image 210.

Figure 6:
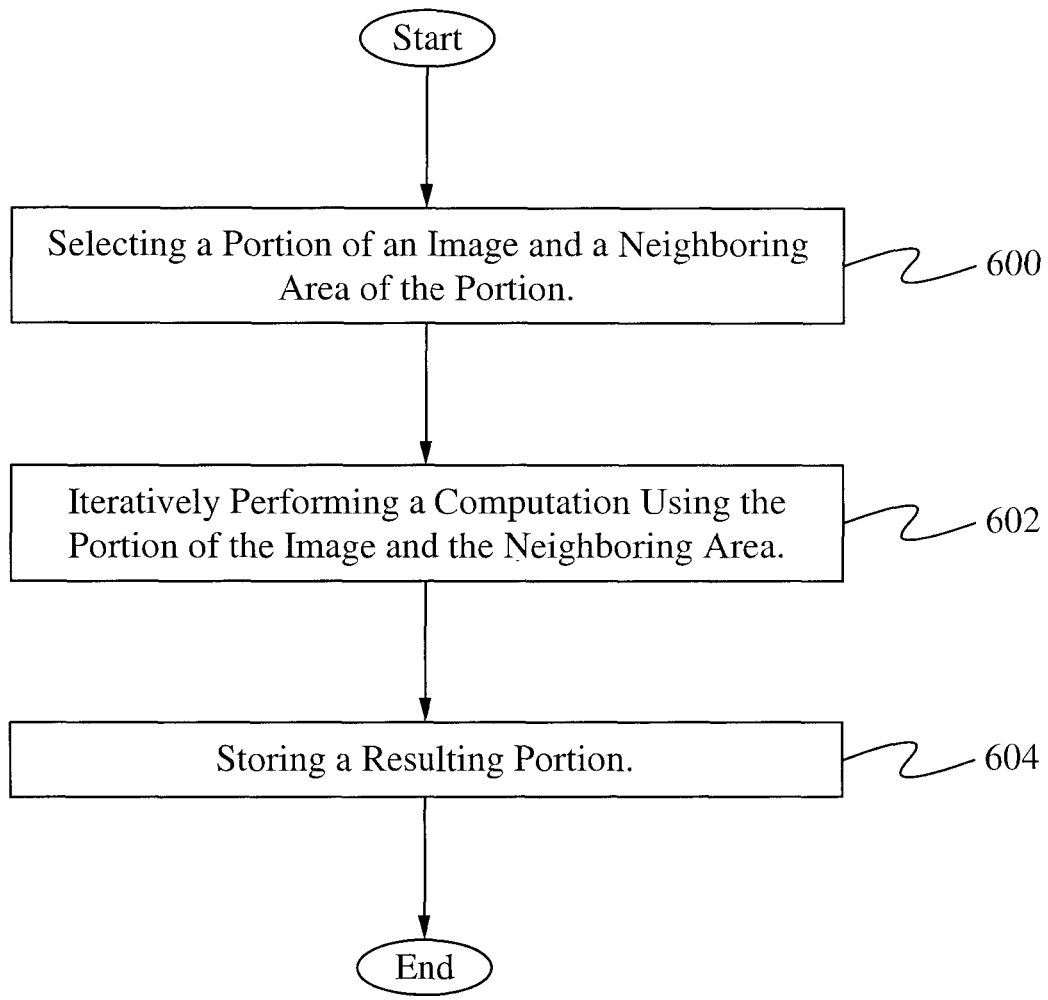
FIG. 6 illustrates a flowchart of a method of block-based variational image processing according to some embodiments.

FIG. 6 illustrates a flowchart of a method of block-based variational image processing according to some embodiments. In the step 600, a portion (e.g. a block) of an image and a neighboring area of the portion including neighboring pixels is selected. In some embodiments, the neighboring area is a size +/−K. In the step 602, the portion of the image including the neighboring area is used in iteratively performing a computation. In some embodiments, the portion of the image including the neighboring area is transferred via a bus to a computation location. In some embodiments, performing a computation includes determining a solution to a problem such as solving a partial differential equation. In some embodiments, the computation is performed in N iterations, where K<<N. In the step 604, a resulting portion (or block) is stored. In some embodiments, the resulting portion is stored in an external memory. The process is able to be repeated for each portion of the image until a fully processed image results.

Table 1 shows that, for example, if a block with a size of 64×64 pixels is selected in an image, there are acceptable ranges for the number of matching points (+/−K) based on the number of iterations (N).

TABLE 1

Acceptable Ranges for the Number of Matching Points.

| | Iterations | | | |
|---|---|---|---|---|
| | 10 | 50 | 100 | 500 |
| Matching Points | 5 to 7 | 8 to 10 | 12 to 15 | 24 to 26 |

Figure 7:
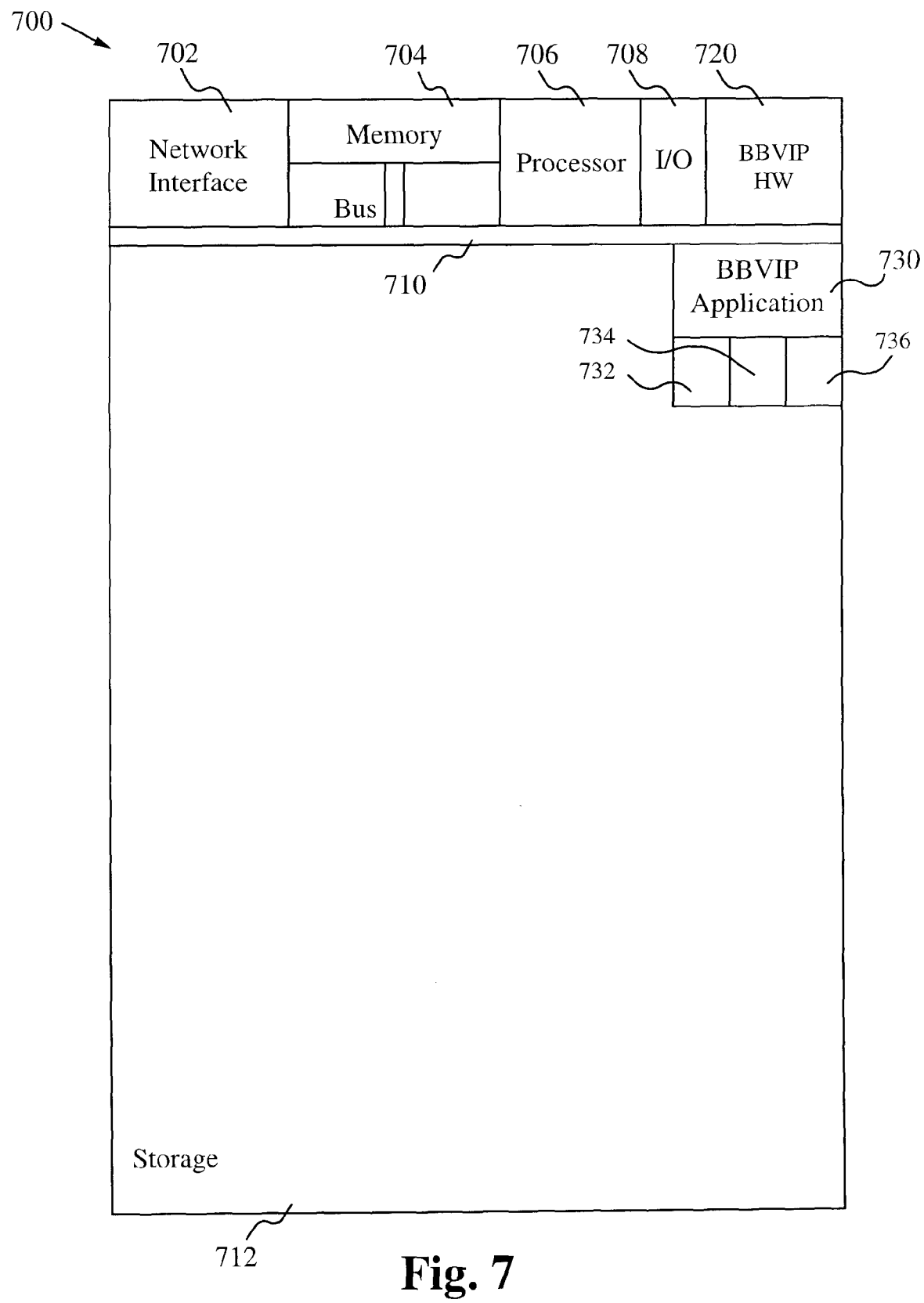
FIG. 7 illustrates a block diagram of an exemplary computing device configured to implement block-based variational image processing according to some embodiments.

FIG. 7 illustrates a block diagram of an exemplary computing device 700 configured to implement block-based variational image processing according to some embodiments. The computing device 700 is able to be used to acquire, store, compute, communicate and/or display information such as images and videos. For example, a computing device 700 is able to acquire and store an image. The block-based variational image processing method is able to be used in image processing on the device 700. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, display, printer, modem, touchscreen, button interface and other devices. Block-based variational image processing application(s) 730 used to perform the block-based variational image processing method are likely to be stored in the storage device 712 and memory 704 and processed as applications are typically processed. More or less components shown in FIG. 7 are able to be included in the computing device 700. In some embodiments, block-based variational image processing hardware 720 is included. Although the computing device 700 in FIG. 7 includes applications 730 and hardware 720 for block-based variational image processing, the block-based variational image processing method is able to be implemented on a computing device in hardware, firmware, software or any combination thereof.

In some embodiments, the block-based variational image processing application(s) 730 include several applications and/or modules. A portion selection module 732 is configured for selecting a portion of an image and a neighboring area of the portion. In some embodiments, the portion selection module 732 also determines the size of the neighboring area. A computation module 734 is operatively coupled to the portion selection module 732, and the computation module 734 is configured for iteratively performing a computation using the portion of the image and the neighboring area. A storing module 736 is operatively coupled to the computation module 734, and the storing module 736 is configured for storing a resulting portion. In some embodiments, a combining module combines the resulting portions to produce a full image.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television, a home entertainment system or any other suitable computing device.

EXAMPLE

An exemplary implementation of block-based variational image processing is for image decomposition. When decomposing an image, the original image is f=u+v, wherein a geometric component is v=λ×div (p) and a texture component is u=f−v.

$$p_{i,j}^{(k+1)} = \frac{p_{i,j}^k + \tau\left(\nabla\left(div(p^{(k)}) - \frac{f}{\lambda}\right)\right)_{i,j}}{1 + \tau\left|\nabla\left(div(p^{(k)}) - \frac{f}{\lambda}\right)\right|_{i,j}}$$

Figure 8:
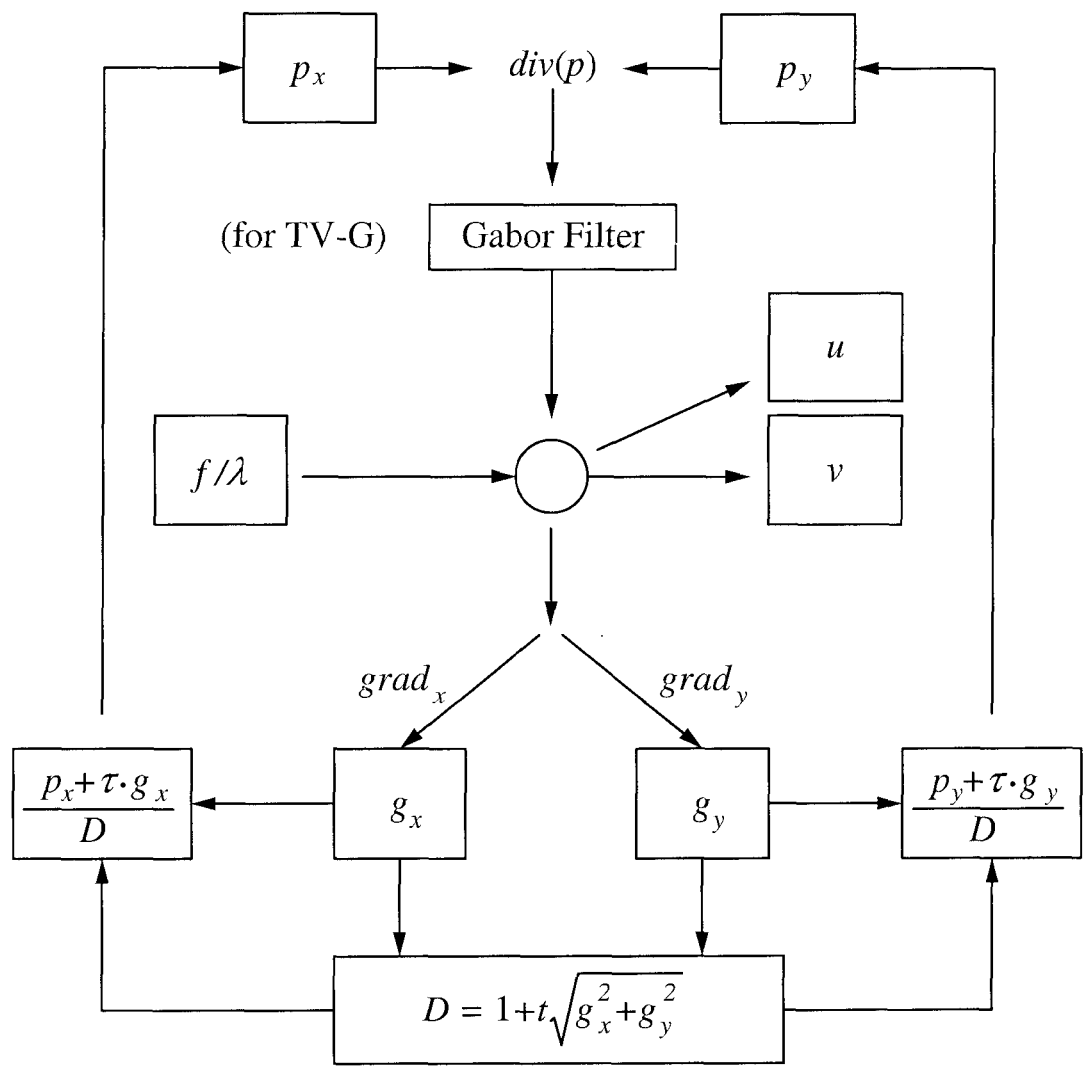
FIG. 8 illustrates a diagram of a decomposition algorithm flow according to some embodiments.
Figure 9:
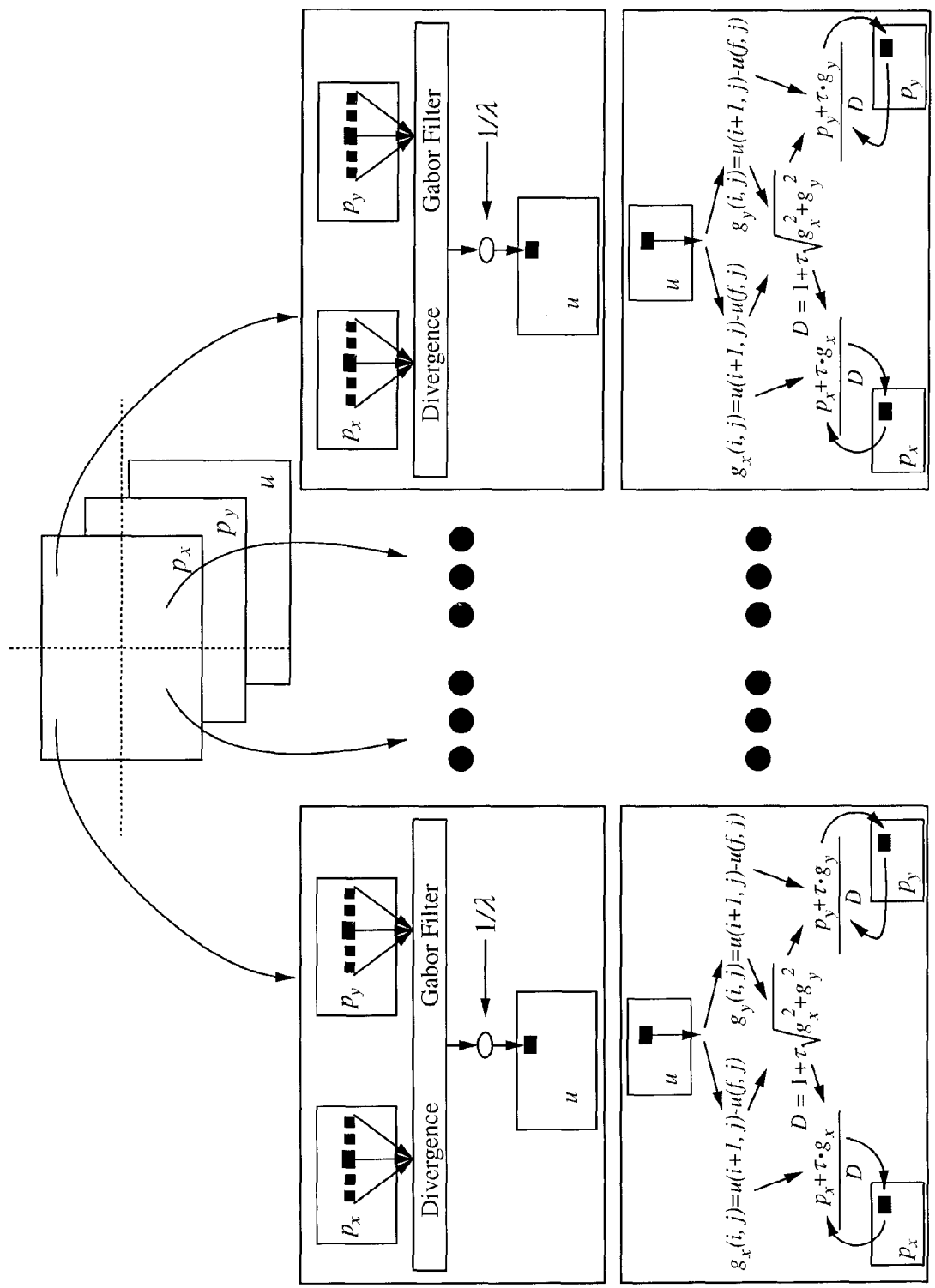
FIG. 9 illustrates a diagram of utilizing multiple processing elements for parallel processing a decomposition algorithm according to some embodiments.

FIG. 8 illustrates a diagram of a decomposition algorithm flow according to some embodiments. The decomposition includes many steps in its computation such as determining a divergence and gradients. To perform the computation, the iterations described above are used. By dividing the image into several portions or blocks, several processing elements are able to process the computations in parallel as shown in FIG. 9.

To utilize the block-based variational image processing, a user acquires an image such as by a digital camera, and then while the image is acquired or after the image is acquired, the image is able to be processed using the block-based variational image processing method. In some embodiments, the camera automatically implements the image processing, and in some embodiments, a user manually selects to implement the image processing.

In operation, the block-based variational image processing method enables image processing with minimized bus bandwidth usage. Furthermore, the block-based variational image processing method is able to be performed on a single chip. The block-based variational image processing is able to be used for applications including, but not limited to denoising, image restoration, image decomposition and image inpainting.

In some embodiments, media able to utilize the method described herein includes but is not limited to images, videos, sounds, music and other data.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method implemented on a device comprising:
   a. selecting a portion of an image and a neighboring area of the portion;
   b. iteratively performing a computation using the portion of the image and the neighboring area, wherein the neighboring area increases with each iteration, wherein the neighboring area includes K number of pixels in each direction, and iteratively performing comprises N number of iterations, and K is smaller than N; and
   c. storing a resulting portion.

2. The method of claim 1 wherein the computation is performed without storing the portion of the image and the neighboring area in an external memory.

3. The method of claim 1 wherein the resulting portion is stored in an external memory.

4. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

5. A system implemented on a device configured for image processing comprising:
   a. a portion selection module configured for selecting a portion of an image and a neighboring area of the portion;
   b. a computation module operatively coupled to the portion selection module, the computation module configured for iteratively performing a computation using the portion of the image and the neighboring area, wherein the neighboring area increases with each iteration, wherein the neighboring area includes K number of pixels in each direction, and the computation module iteratively performs N number of iterations, and K is smaller than N; and
   c. a storing module operatively coupled to the computation module, the storing module configured for storing a resulting portion.

6. The system of claim 5 wherein the computation module is configured to perform the computation without storing the portion of the image and the neighboring area in an external memory.

7. The system of claim 5 wherein the resulting portion is stored in an external memory.

8. The system of claim 5 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

9. A device comprising:
   a. a memory for storing an application, the application configured for:
      i. selecting a portion of an image and a neighboring area of the portion;
      ii. iteratively performing a computation using the portion of the image and the neighboring area, wherein the neighboring area increases with each iteration, wherein the neighboring area includes K number of pixels in each direction, and iteratively performing comprises N number of iterations, and K is smaller than N; and
      iii. storing a resulting portion; and
   b. a processing component coupled to the memory, the processing component configured for processing the application.

10. The device of claim 9 wherein the computation is performed without storing the portion of the image and the neighboring area in an external memory.

11. The device of claim 9 wherein the resulting portion is stored in an external memory.

12. The device of claim 9 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

13. A digital camera comprising:
   a. a memory for storing an application, the application configured for:
      i. selecting a portion of an image and a neighboring area of the portion;
      ii. iteratively performing a computation using the portion of the image and the neighboring area, wherein the neighboring area increases with each iteration, wherein the neighboring area includes K number of pixels in each direction, iteratively performing comprises N number of iterations, and K is smaller than N; and
      iii. storing a resulting portion; and
   b. a processing component coupled to the memory, the processing component configured for processing the application.

14. The digital camera of claim 13 wherein the computation is performed without storing the portion of the image and the neighboring area in an external memory.

15. The digital camera of claim 13 wherein the resulting portion is stored in an external memory.

* * * * *